United States Patent [19]
Barnaby et al.

[11] Patent Number: 4,731,934
[45] Date of Patent: Mar. 22, 1988

[54] WORKPIECE POSITION CONTROL

[75] Inventors: Anthony B. Barnaby; Michael W. Mills, both of Leicester, United Kingdom

[73] Assignee: Rank Taylor Hobson Limited, England

[21] Appl. No.: 20,467

[22] Filed: Mar. 2, 1987

[30] Foreign Application Priority Data

Mar. 4, 1986 [GB] United Kingdom ................. 8605325
Oct. 10, 1986 [GB] United Kingdom ................. 8624396

[51] Int. Cl.⁴ ............................ G01B 7/03; G01B 7/28
[52] U.S. Cl. ........................................ 33/504; 33/569; 33/645
[58] Field of Search ................. 33/503, 504, 555, 569, 33/573, 642, 644, 645

[56] References Cited

U.S. PATENT DOCUMENTS

| | | | |
|---|---|---|---|
| 3,270,423 | 9/1966 | Birrell et al. | 33/174 |
| 3,524,261 | 8/1970 | Klink | 33/569 |
| 3,633,011 | 1/1972 | Bederman | 33/504 |
| 3,839,800 | 10/1974 | Bederman et al. | 33/174 |
| 4,114,281 | 9/1978 | Pavlovsky et al. | 33/180 |
| 4,218,825 | 8/1980 | Asakura et al. | 33/504 |
| 4,483,079 | 11/1984 | Band et al. | 33/503 |

FOREIGN PATENT DOCUMENTS 1350566 4/1974 United Kingdom .
1438270 6/1976 United Kingdom .
1452280 10/1976 United Kingdom .
1479621 7/1977 United Kingdom .
2076965 12/1981 United Kingdom .

Primary Examiner—Richard R. Stearns
Attorney, Agent, or Firm—Lerner, David, Littenberg, Krumholz & Mentlik

[57] ABSTRACT

Metrological apparatus is provided with a turntable (4) which is movable horizontally and pivotally for centering and levelling. The turntable (4) is supported at three points (A,B,P), one (P) of which is fixed and the other two (A,B) of which are vertically movable by motorized jacks. Centering and levelling is achieved automatically by means of a computer (72) which calculates the required horizontal and pivotal movements of the turntable (4) from data obtained by sensing the workpiece surface with a transducer (12).

17 Claims, 12 Drawing Figures

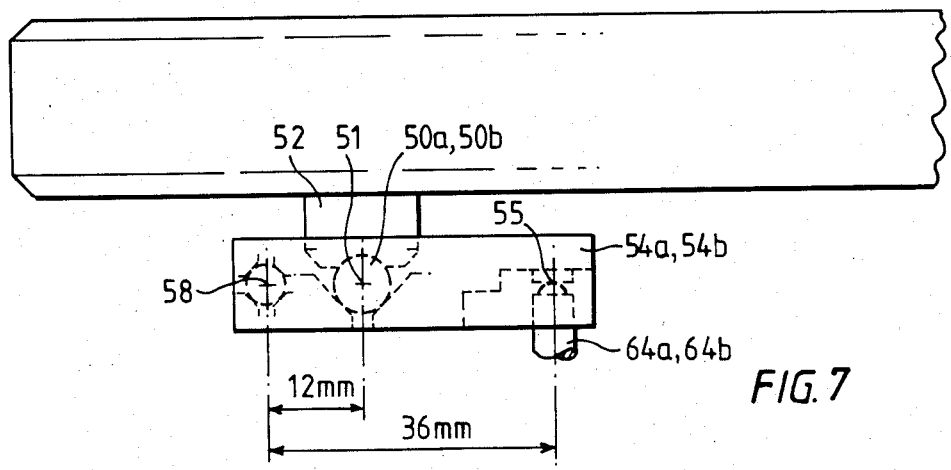

WORKPIECE POSITION CONTROL

This invention relates to workpiece position control and is particularly concerned with a method and apparatus for centring and levelling a workpiece on a turntable, especially in metrological apparatus.

Metrological apparatus is known in which a workpiece is positioned on a turntable and measurements are taken by rotating the turntable whilst a transducer senses the surface of the workpiece. It is generally necessary to perform an operation known as centring and levelling in which the turntable is displaced horizontally and is tilted to bring the workpiece to a desired position, typically in order to bring a required axis of the workpiece into coincidence with the rotary axis of the turntable. Further, it is highly desirable that the centring and levelling operation should be performed automatically so that it may be carried out efficiently and quickly.

Metrological apparatus in which centring and levelling may be performed automatically is already known and commercially available. In the known apparatus, the turntable, which is circular, is mounted on a support structure which includes a spherical bearing surface permitting universal tilting movement of the turntable about a point which is above the work surface of the turntable and is in a known horizontal plane. Two jacks located beneath the turntable at positions spaced apart by 90 degrees from each other are provided for effecting the tilting movement about respective orthogonal axes located in the above mentioned horizontal plane. Springs urge the turntable downwardly to maintain it in engagement with the jacks and to maintain the spherical bearing surface in engagement with a mating seating which in one construction comprises a ring of balls set in the support structure. The support structure is mounted on a spindle for rotating the turntable, by means of a further bearing providing for horizontal movement of the support structure whereby the centring operation may be performed.

In this prior art apparatus, centring and levelling is carried out, after the workpiece to be tested has been placed on the turntable, by firstly determining the location of the centre of that portion of the workpiece surface located in the horizontal plane containing the point about which the turntable is tiltable. This determination is made by bringing a stylus included in the apparatus into contact with the workpiece surface in this horizontal plane and driving the spindle to rotate the workpiece about the spindle axis. The degree of eccentricity between the axis of rotation of the workpiece (or axis of the spindle) and the position of the centre of the workpiece surface in this plane can then be determined from the signals output by a transducer with which the stylus is associated. Thereafter, the support structure for the turntable is displaced horizontally relative to the spindle in order to bring the determined centre of the workpiece surface into coincidence with the axis of the spindle. Thus, the centring operation is completed for that plane. Levelling is performed by moving the stylus to a different horizontal plane, driving the spindle to rotate the workpiece, and determining the eccentricity of the centre of the workpiece surface in this horizontal plane with respect to the spindle axis utilising the signals output by the transducer. After this eccentricity has been determined, the jacks are actuated as necessary to bring the centre of the workpiece surface in the second horizontal plane into coincidence with the axis of rotation of the turntable (the spindle axis). This completes the levelling operation and thus centring and levelling is complete. Since the tilting movement of the turntable which takes place during this levelling operation is centred at a point in the first horizontal plane, which point has been made coincident with the spindle axis by means of the centring operation, the levelling operation does not upset this coincidence.

This apparatus suffers from a number of disadvantages. Firstly, every centring operation has to be performed by sensing the workpiece surface located in the same, fixed horizontal plane containing the centre of tilting of the turntable, and in some cases a workpieces will not have a surface in that plane which can be sensed. This is a severe disadvantage with workpieces of complex shape, such as crank shafts. Second, the centre of mass of the workpiece must always be located within the 90 degree sector of the turntable defined by the positions of the two jacks: locating the centre of mass outside this sector would produce a turning moment on the turntable tending to move the turntable out of contact with these jacks. Thirdly, manufacture of the spherical bearing which supports the turntable to the required degree of accuracy is difficult and expensive.

The invention provides an apparatus in which one or more of these problems may be eliminated.

In one aspect, the invention provides a workpiece positioning apparatus having a turntable for supporting the workpiece and computer means which is operable to perform a centring and levelling operation in which any decentring of the workpiece arising as a consequence of tilting of the turntable for levelling purposes is compensated for. Thus, with the apparatus constructed in accordance with this aspect of the invention, the centring and levelling may be performed with reference to any horizontal planes, without being restricted to the unique horizontal plane containing the centre of tilting of the turntable as in the above described prior art.

In another aspect, the invention provides workpiece positioning apparatus having a turntable for the workpiece, the turntable being supported at three points located at the apices of a triangle, preferably an equilateral triangle, within which the centre of the turntable is located, at least two of said points being adjustable in height, and computer means for performing a centring and levelling operation in which adjustment of the height of one or more of said points takes place.

In a further aspect the invention provides a method or apparatus for performing a centring and/or levelling operation in which the workpiece is sensed by sensing means and the operation is performed under the control of electronic control means in accordance with a predetermined algorithm.

In another aspect, the present invention provides apparatus having a turntable for supporting a workpiece, the turntable being pivotal about a point or axes below the surface thereof for effecting levelling, and electronic control means being provided for effecting said pivotal movement. The point or intersection of the axes is preferably offset from the axis of rotation of the turntable.

Other aspects of the invention will be apparent from the following description and claims.

The invention is described further by way of example with reference to the accompanying drawings in which.

Figure 5:
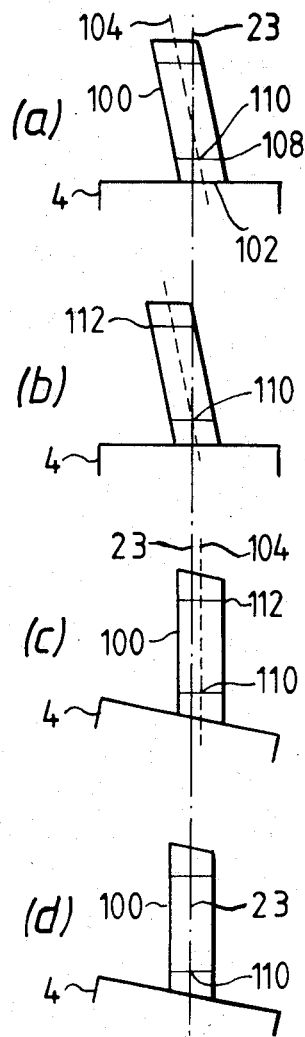
Figure 6:
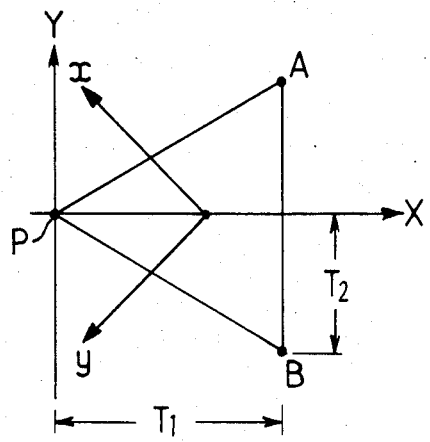

FIGS. 5a to 5d diagrammatically illustrate a centring and levelling operation: and FIGS. 6 to 9 are diagrams for assisting in understanding the computations performed by the control system for carrying out the centring and levelling operation illustrated in FIG. 6.

Figure 1:
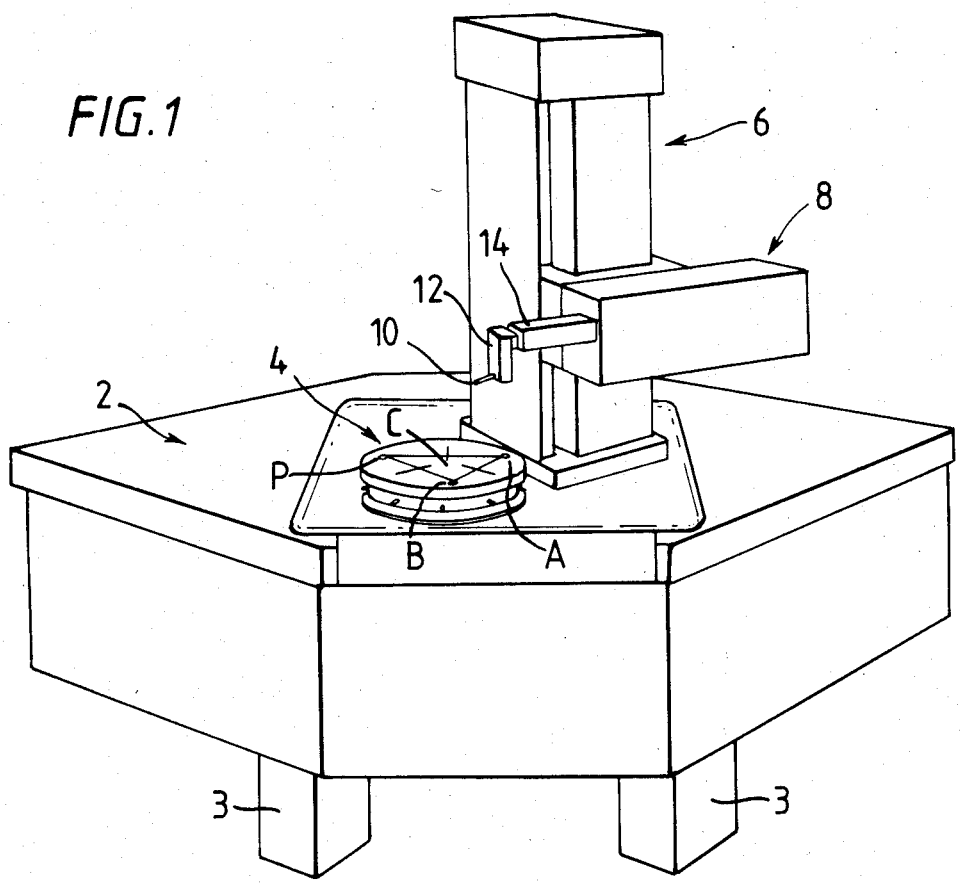
FIG. 1 is a perspective view of an apparatus embodying the invention.
Figure 2:
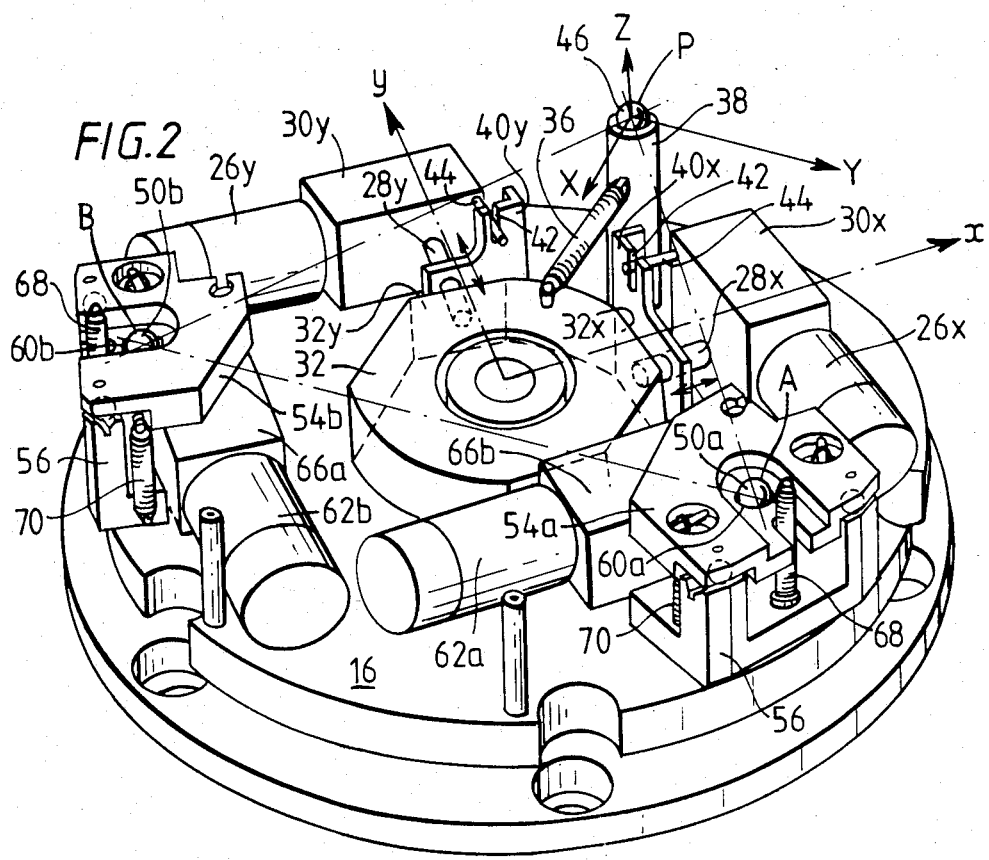
FIG. 2 is a perspective view of a turntable support structure included in the apparatus of FIG. 1.
Figure 3:
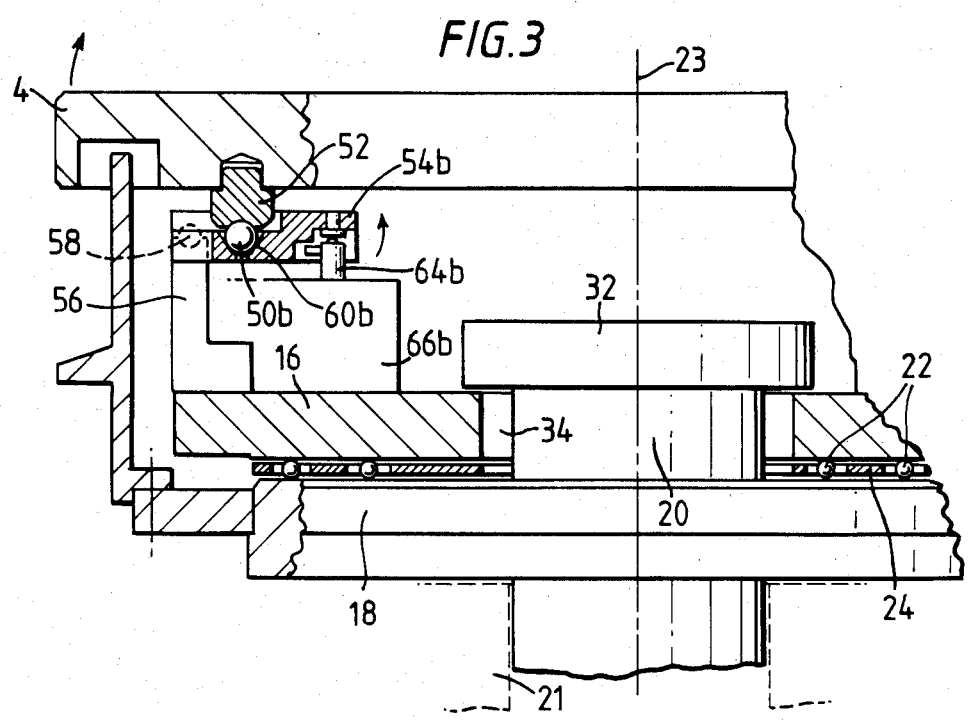
FIG. 3 is a section through part of the support structure of FIG. 2, but showing also the turntable.

With reference to FIG. 1, a metrological apparatus comprises a work bench 2 supported by a frame 3 (whose feet only are visible in FIG. 1). The frame 3 carries a turntable 4 on which a workpiece may be mounted. A vertical column 6 supports a motor-driven vertically movable carriage 8. A stylus 10 is mounted on the end of a pivotal arm 12, which enables the attitude of the stylus to be changed, which in turn is carried on the end of a horizontally (radially) movable arm 14 supported by the carriage 8. Measuring operations on a workpiece are performed by causing the stylus 10 to traverse the surface of the workpiece by rotating the turntable and/or moving the stylus radially and/or moving the stylus vertically. As shown in FIGS. 2 and 3, the support structure for the turntable 4 includes a base 16 carried by a disc 18 which is secured to a motor driven spindle 20. A bearing arrangement 21, indicated diagrammatically in FIG. 3 by broken lines, supports the spindle 20 for rotation about its own axis 23, which is vertical. The bearing arrangement 21 is mounted in the frame 3 and is preferably as described in our UK Published Patent Application No. 2178805A. A set of ball bearings 22 in a disc shaped cage 24 is interposed between the base 16 and the disc 18 to provide for horizontal movement of the base 16 relative to the disc 18. This movement is effected along orthogonal x and y axes by means of motors 26x, 26y which are fixed on the base 16 and respectively drive reciprocable drive rods 28x and 28y via gear boxes 30x and 30y which may, for example, comprise worm and wheel assemblies. The drive rods 28x and 28y are driven respectively along the x and y axes when the respective motors are actuated. A boss 32 which is fixed to the upper end of the spindle 20, which projects through a central opening 34 in the base 16, has flats 32x and 32y which are engaged respectively by the ends of the drive rods 28x and 28y and are located, respectively, in planes which are perpendicular to the x and y axes. A tension spring 36 having one end connected to the boss 32 and the other end connected to a post 38, which is fixed to the base 16, maintains the flats 32x and 32y in engagement with the ends of the respective drive rods 28x and 28y. Thus, with the aid of the motors 26x and 26y and the force of the spring 36 the base 16 may be moved accurately determined distances in either direction along the x and y axes. Guide plates 40x and 40y through which the drive rods 28x and 28y pass respectively, have slots 42 receiving guide pins 44 carried by the gear boxes 30x and 30y.

A ball 46 mounted in a recess in the upper end of the post 38 supports the turntable 4 for universal pivotal movement about the point P. At points A and B, the turntable 4 is supported respectively on balls 50a and 50b via spacers 52 (FIG. 3 only) which are fixed to the underside of the turntable 4 and rest on the balls 50a, 50b. Lever plates 54a, 54b, mounted on brackets 56 for pivotal movement about horizontal axes 58 (perpendicular to the plane of the paper of FIG. 3) contain depressions 60a, 60b in which the balls 50a, 50b are respectively received. Motors 62a, 62b drive jacks 64a, 64b (FIG. 3 only) through gear boxes 66a, 66b for pivoting the lever plates 54a, 54b upwardly and downwardly about their pivotal axis 58. Thus, actuation of the motor 62a causes the turntable to tilt about an axis joining points P and B and actuation of the motor 62b causes the turntable 4 to tilt about an axis joining the points P and A. These axes pass through the centres of the balls 46, 50a and 50b.

The points ABP are located at the apices of an equilateral triangle whose centre C is coincident with the centre of the turntable 4 i.e. the points ABP are symmetrically disposed relative to the point C. This provides the maximum area of the turntable within which a workpiece may be located without causing instability of the turntable. As a result, however, the axes PA and PB about which the turntable is tiltable are at 60 degrees to each other.

Tension springs 68 urge the turntable downwardly to maintain the spacers 52 in engagement with the balls 50a and 50b and tension springs 70 urge the lever plates 54a and 54b downwardly to maintain them in engagement with the jacks 64a, 64b.

A cylindrical wall 69 fixed to the disc 18 encloses the support structure above described.

Figure 4:
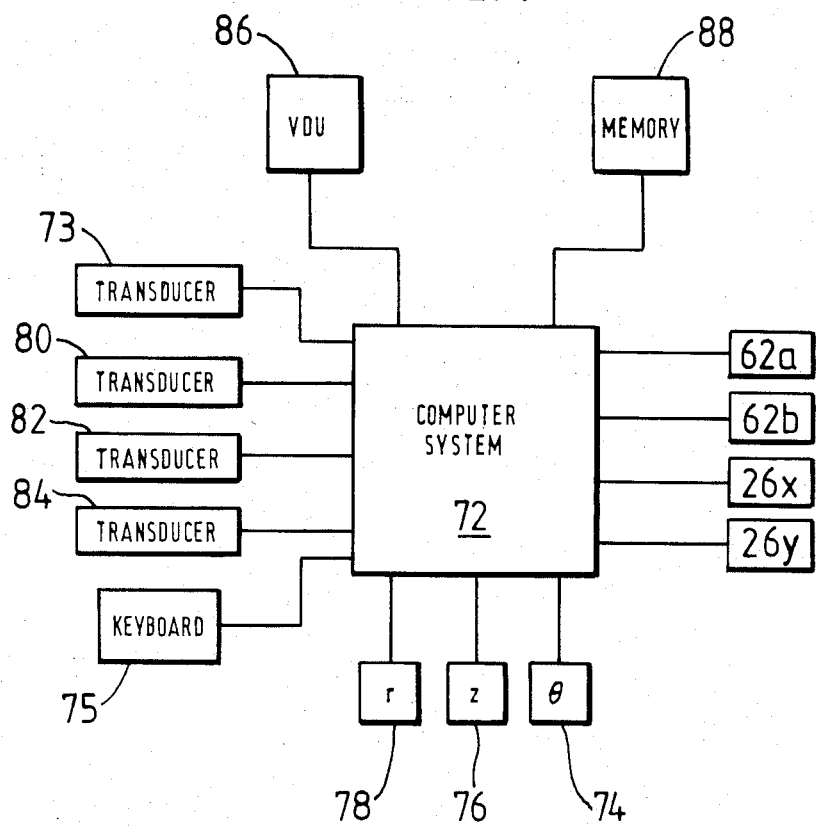
FIG. 4 is a simplified block diagram of a control system included in the apparatus of FIG. 1.

As seen in the simplified block diagram of FIG. 4, motors 26x, 26y, for centring, and motors 62a, 62b, for levelling, are controlled by a computer system 72 which receives inputs from a transducer 73 which responds to the stylus 10. An operator controlled keyboard 75 is provided for supplying instructions to the computer system 72. The computer system 72 also controls a motor 74 which drives the spindle 20 for rotating the turntable (the θ axis), a motor 76 for raising and lowering the carriage 8 on the column 6 (z axis), and a motor 78 which drives the arm 14 in the radial direction (the r axis) for bringing the stylus 10 into and out of contact with the workpiece surface. Further transducers 80, 82 and 84 provide the computer system 72 with data representative of the angular position of the turntable 4, the vertical position of the carriage 8 and the radial position of the arm 14. A VDU 86 and memory 88 are also connected to the computer system 72, the memory 88 storing the received data and storing programs in accordance with which the computer system 72 operates. The computer system 72 may comprise one or more computers.

The movements which the turntable 4 undergoes to achieve centring and levelling of a workpiece will be understood by reference to FIGS. 5a to 5d. For simplicity, FIG. 5 illustrates a cylindrical workpiece 100 positioned on the turntable 4, within the triangle ABP. The workpiece 100 stands on one end 102 which is plane but assumed to be at a slight angle (much exaggerated in FIG. 5) to the radial plane, so that the axis 104 of the workpiece 100 is at an angle to the vertical axis of rotation 23 of the spindle 20. The sequence of steps carried out in the centring and levelling operation illustrated in FIG. 5 comprises firstly rotating the turntable 4 with the stylus 10 arranged to sense the surface of the workpiece 100 in a horizontal plane 108. The computer system 72 receives the output from the transducers (80, 73, 84) and, utilising a form fitting algorithm, computes the magnitude and direction of the displacement between the centre 110 of the workpiece in plane 108 and the axis 23. The polar parameters output by the transducers are transformed to a notional cartesian system (u,v), and given that N points are sensed on the surface having coordinates ($u_i$, $v_i$), the centre ($u_o$, $v_o$) and radius R of the surface are calculated using a modified least squares error criterion by minimising the sum:

$$\sum_{i=1}^{N} [(u_i - u_o)^2 + (v_i - v_o)^2 - R^2]^2$$

Having computed the centre, the computer then actuates motors 26x and 26y as necessary to bring point 110 into concidence with the axis 23 as shown in FIG. 5b. The next step is for the turntable 4 to be rotated with the stylus 10 arranged to sense the surface of the workpiece in a different horizontal plane 112 spaced from the plane 108, in this example plane 112 being above plane 108. Again utilizing the form fitting algorithm, the computer system 72 determines the position of the centre of the workpiece in the plane 112. Thereafter, the computer system 72 computes the angular movement of the turntable 4 and workpiece 100 necessary to bring the workpiece from the position shown in FIG. 5b to the position shown in FIG. 5c in which the axis 104 of the workpiece is parallel to the axis 23 of the spindle. This computation will be described further below. As can be seen in FIG. 5c, the result of this angular movement or tilting, is that point 110 again becomes displaced from the axis 23. The final step is the performance of a second centring operation in which the position of the axis 104 of the workpiece relative to the axis 23 is determined utilising again the form fitting algorithm mentioned above and the motors 26x and 26y are again actuated, in order to bring the axis 104 into coincidence with the axis 23 as shown in FIG. 5d. Although, for simplicity, the foregoing description of FIG. 5 has been on the basis that the various steps are carried out in a particular sequence, this is not essential and in practice centring and levelling may be achieved by firstly taking measurements in the planes 110 and 112 with the workpiece 100 and turntable 4 in the position shown in FIG. 5a and thereafter, motors 26x and 26y and 62a and 62b are actuated simultaneously or in any desired sequence, but preferably in the order to centre the workpiece and then level it, in order to achieve the condition shown in FIG. 5d.

The calculations of the horizontal and tilting movements required to be effected by the turntable 4 in order to achieve centring and levelling will now be described. In the following description, motors 26x and 26y will be referred to as the x and y motors and motors 62a and 62b will be referred to as the a and b motors. Again, for simplicity, although the component may have any form provided that the surfaces being assessed have a regular profile it will be convenient to consider the case of centring and levelling a cylindrical workpiece such as the workpiece 100 shown in FIG. 5, since the axis of a cylinder is readily defined.

In the discussions which follow it will be convenient to refer all motions to a right-handed cartesian coordinate system X, Y and Z having unit vectors i, j, k. The origin of the co-ordinate system is chosen to be coincident with the fixed point P, and the X axis is chosen to bisect the line joining the two points A and B. The co-ordinate system is shown in FIG. 6, in which the Z axis is perpendicular to the plane of the paper and is also shown on FIG. 2. Centring of the table is achieved by resolving the required motion in terms of the X and Y axes into motions parallel to the line of action of the x and y motors.

Let the required centring vector be $c_1i + c_2j$, and let the unit vectors parallel to the lines of action of the x and y motors be $e_x$ and $e_y$ respectively. From the geometry it may then be seen that.

$$c_1i + c_2j = -k\,[(c_1 - c_2)e_x + (c_1 + c_2)e_y] \quad (1)$$

wherein $k = 2^{-\frac{1}{2}}$.

In discussing the levelling of a component placed on the table it is convenient to introduce two more variables $\theta_1$ and $\theta_2$ where $\theta_1$ is the angle of tilt of the table top about the X axis, and $\theta_2$ is the corresponding angle about the Y axis. Thus the height of any point ($X_1$, $Y_1$) on the surface of the table, with respect to its height when the surface is horizontal, is given by $$Z_1 = X_1 \tan\theta_1 + Y_1 \tan\theta_2 \quad (2)$$

Now, introducing parameters $T_1$ and $T_2$ as shown in FIG. 6 and referring to the incremental heights of points A and B as $Z_A$, $Z_B$, this gives the formulae $$Z_A = T_1 \tan\theta_1 + T_2 \tan\theta_2 \quad (3a)$$

$$Z_B = T_1 \tan\theta_1 - T_2 \tan\theta_2 \quad (3b)$$

From these equations it is possible to calculate the incremental heights of A and B, above the horizontal plane through P, in terms of the angles of tilt $\theta_1$ and $\theta_2$.

As will be seen from FIG. 6, the magnitudes of $T_1$ and $T_2$ are dependent upon the angle APB between the axes AP and BP about which the turntable is tiltable. Thus, the calculations performed by the computer 72 in carrying out the levelling operation are dependent upon the angle APB.

Before proceeding it is necessary to consider further the actual mechanism by which the points A and B are moved in the vertical plane by the a and b motors in the preferred embodiment.

Figure 8:
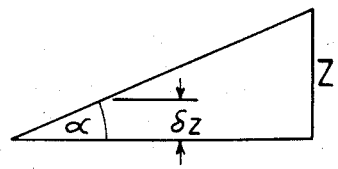

As shown in FIG. 7 by way of example, the distance between the axis 58 and the center 51 of the ball bearing 50a or 50b is 12 millimeters and between the axis 58 and the point of contact 55 of the jack 64a or 64b with the lever 54a or 54b is 36 millimeters. Referring to FIG. 8 it can be seen that if the screw jack 64a or 64b is raised by a height z, then the centre of the ball 50a or 50b will move through a height $\delta z$. It can be seen that $$z = 36 \tan\alpha \quad (4)$$

$$\delta z = 12 \sin\alpha$$

from which
$$z = 36\,\delta z/(12^2 - \delta z^2)^{\frac{1}{2}} \quad (5a)$$

or $$z = 3\delta z + 3\delta z^3/(2 \times 12^2) + 3^2 \delta z^5/(2^3 \times 12^4) + \quad (5b)$$

Figure 9:
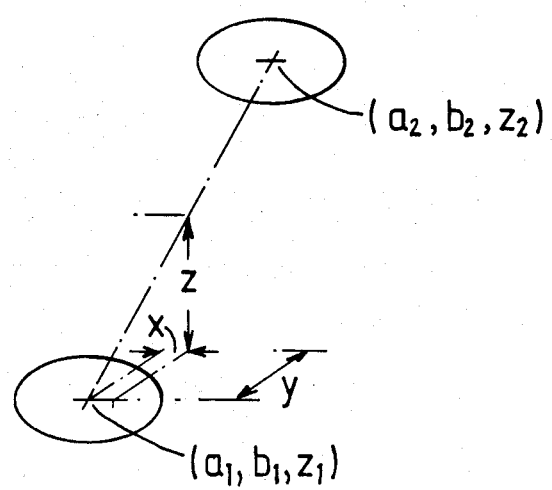

Suppose that the table 4 is initially horizontal and that a cylinder is measured at two heights ($z_1$, $z_2$), the centres of the two planes being found as ($a_1$, $b_1$, $z_1$) and ($a_2$, $b_2$, $z_2$) as shown in FIG. 9. It can be seen that any point at height z and lying on the cylinder axis will have co-ordinates, in the chosen system, given by $$X = [(a_2 - a_1)/(z_2 - z_1)]Z + a_1$$

$$Y = [(b_2 - b_1)/(z_2 - z_1)]Z + b_1$$

Writing $h = (z_2 - z_1)$, and comparing these equations with equations (2)

$$\tan \theta_1 = (a_2 - a_1)/h$$

$$\tan \theta_2 = (b_2 - b_1)/h$$

The incremental heights $\delta Z_A$, $\delta Z_B$ through which points A and B must be moved in order to compensate for these angles are given by equations (3) as $$\delta Z_A = T_1 \tan \theta_1 + T_2 \tan \theta_2$$

$$\delta Z_B = T_1 \tan \theta_1 - T_2 \tan \theta_2$$

and from equation (5) the heights through which the screw jacks must be raised are given by $$Z_A = 3 \, \delta Z_A / (12^2 - \delta Z_A^2)^{\frac{1}{2}}$$

$$Z_B = 3 \, \delta Z_B / (12^2 - \delta Z_B^2)^{\frac{1}{2}}$$

Using the binomial expansion of these equations and truncating the series at the second term gives $$Z_A = 3\delta Z_A + p \, \delta Z_A^3$$

$$Z_B = 3\delta Z_B + p\delta Z_B^3$$

where $p = 1.1331161 \times 10^{-2}$ and includes a correction for the truncations of the series.

Thus, the number of revolutions of the a and b motors required to achieve levelling can be easily determined utilising the above calculations. Further, the number of revolutions of the x and y motors required to achieve centring is also easily calculated. Both calculations are performed by the computer system 72 and the results utilised drive the a, b, x and y motors.

Thus, the illustrated embodiment possesses the substantial advantages that the planes 108 and 112 shown in FIG. 5 at which the surface of the workpiece is measured for centring and levelling purposes may be located anywhere within the range of operation of the transducers 73 and 84; the workpiece may be positioned with its centre of mass anywhere within the triangle ABP, which is substantially larger than the corresponding area in prior art apparatus and, being symmetrical about the centre of the turntable, is much more conveniently located; and since the turntable is supported at three points, two of which are of adjustable height for providing tilting movement for levelling purposes, the need for expensive large spherical bearings as in the prior art is eliminated.

The apparatus described has the combined advantage that the centring and levelling operation can be carried out automatically, that the mechanical construction of the turntable and its drive means may be relatively simple, that the turntable has a high degree of stability, and that there is greater diversity of the types of workpieces which can be assessed.

Furthermore, the aspect of the invention concerned with making measurements at planes spaced from the centre or axes of tilt may be applied to a metrological apparatus in which the workpiece is not supported on a worktable, but rather is held in a chuck or the like which may be rotated about an axis other than a vertical axis, for example a horizontal axis.

The invention is not confined to sensing external surfaces of the workpiece (such as the bearing surfaces of a crankshaft), but is also applicable when internal surfaces (such as the input and output bearing seatings of a gearbox housing) are to be detected.

In some instances, rather than aligning the centres of two portions of the workpiece (such as two bearing surfaces of a crankshaft) it is desirable to centre one point of the workpiece on the turntable axis and to level another planar surface of the workpiece by making it orthogonal to the axis. For example, an engine piston may desirably be centred and levelled by centring the piston crown and setting the lower edge of the piston skirt at right angles to the axis. In this case, rather than determining the centre of a second portion of the workpiece, the inclination of a second portion of the workpiece, or a reference surface stationary thereto (such as the turntable surface on which the piston rests), is determined. Then, the determined centre can be centred; and then the inclination can be adjusted; and then the centre can be recentred in compensation for any decentring arising from the inclination adjustment.

The invention is not restricted to use with workpieces having circular portions to be sensed, but can be used with workpieces having sections of other shapes, such as rectangular, triangular, elliptical and hexagonal shapes, to be sensed.

In the case where the workpiece is cylindrical, for example, it is not necessary to sense the circular profile of the workpiece in two spaced planes, but instead the sensor can be tracked along a helical path relative to the workpiece surface and the amounts of transverse and tilt adjustment can then be determined.

Preferably, the arrangement of the transducer 10, the support structure 12, 14 thereof and the control system shown in FIG. 4 are all as described in our copending application filed simultaneously herewith, in the names Hugh Rogers Lane and Peter Dean Onyon and claiming priority from British Patent Application No. 8605324 filed Mar. 4 1986. In that arrangement, a high resolution transducer having a small range of operation is mounted on a radially movable arm which is motor driven under computer control in response to the output of the transducer so that the transducer may automatically follow a workpiece surface having large variations of form. Particularly, the transducer may have a resolution to about 12 nanometers over a range of about 0.4 mm and the radially movable arm may have a range of movement of about 200 mm and be provided with a position sensing system with a resolution of about 200 nanometers. This arrangement simplifies the centring and levelling operation in that accurate prepositioning of the workpiece on the turntable by eye is not needed since the transducer system of our aforesaid copending application can accommodate any centring and levelling errors within the range of the available centring and levelling adjustments of the turntable.

We claim:

1. Apparatus for performing an operation on a workpiece, comprising:
    a support rotatable about a predetermined axis;
    a workpiece receiving member mounted on said rotatable support for rotation therewith;
    first means supporting said receiving member for tilting movement in any direction relative to said rotatable support, said first supporting means comprising three support elements supporting said receiving member at only three points, a first of said support elements being adjustable to tilt said member about a first tilt axis extending between the second and third said support elements, the second said support element being adjustable to tilt said member about a second tilt axis which is at an angle to said first tilt axis and extends between said first and third elements, said three points being at the apices of a triangle within which the centre of said workpiece receiving member is located;

first drive means for adjusting said first and second elements to effect said tilting movement;

second means supporting said receiving member for transverse movement relative to said rotatable support;

second drive means for effecting said transverse movement;

third drive means for rotating said rotatable support;

a surface sensor adapted to traverse and sense the workpiece surface during relative movement between the workpiece and the sensor;

means mounting said surface sensor for movement substantially parallel to and towards and away from said axis;

fourth drive means for effecting said movement of said sensor; and computer means which is responsive to said sensor and includes program means for detecting centring and levelling errors and for controlling said first drive means dependent upon said angle between said tilt axes and a said levelling error and to control said second drive means dependent upon a said levelling error and a said centring error, to perform a centring and levelling correcting operation.

2. Apparatus according to claim 1, wherein said angle between said tilt axes is other than a right angle.

3. Apparatus according to claim 2, wherein said points are located at the apices of an equilateral traingle, said angle thereby being 60 degrees.

4. Apparatus according to claim 3, wherein said points are symmetrically disposed relative to the centre of said workpiece receiving member.

5. Apparatus according to claim 4, wherein the third of said three support elements is fixed.

6. Apparatus according to claim 5, wherein said first drive means comprises first and second motors for effecting said tilting about said first and second tilt axes respectively.

7. Apparatus according to claim 1, wherein said second drive means comprises first and second motors for effecting said transverse movement in respective orthogonal directions.

8. Apparatus according to claim 7, wherein said orthogonal directions are bisected by a line which is equidistant from said first and second support elements and passes through said third support element.

9. Apparatus according to claim 1, wherein said predetermined axis is vertical.

10. Apparatus according to claim 9, wherein said workpiece receiving member is a turntable.

11. Apparatus according to claim 1, wherein said program means is operable for performing a centring and levelling correcting operation in which centres of the workpiece in first and second planes normal to said predetermined axis and at spaced apart positions therealong are determined and said first and second drive means are actuated in dependence upon said determination.

12. Apparatus according to claim 11, wherein said program means is operable for controlling said first and second drive means in dependence upon a first computation in which transverse movement of the workpiece receiving member necessary to bring a first of said workpiece centres into coincidence with said axis is determined; a second computation in which the tilting of the member necessary to bring a line joining said workpiece centres into parallelism with said predetermined axis is determined, and a third computation in which the transverse movement of the member necessary to compensate for displacement of said first workpiece centre as a consequence of said tilting is determined.

13. Apparatus according to claim 12, wherein said program means is operable to perform a centring and levelling sequence in which said first computation is performed and said second drive means actuated in accordance therewith to bring said first workpiece centre into coincidence with said predetermined axis, and thereafter the position of said second centre is determined, said second and third calculations are performed and said first and second drive means are actuated in accordance with said second and third calculations.

14. Apparatus according to claim 13, wherein said program means is arranged so that said second drive means is actuated in accordance with said second calculation following completion of actuation of said first drive means.

15. Apparatus according to claim 13, wherein said program means is arranged so that said second drive means is actuated in accordance with said third calculation simultaneously with actuation of the first drive means in accordance with the second calculation.

16. Apparatus according to claim 13, wherein said programs means is arranged so that said performance of said first, second and third calculations and said actuation of said first and second drive means are carried out such that said first and second drive means are simultaneously actuated for bringing both of said workpiece centres into coincidence with said predetermined axis.

17. Apparatus according to claim 1, wherein said program means is further arranged for performing a metrological operation on said workpiece by actuating said third and fourth drive means to cause said sensor to traverse a surface of said workpiece, output signals from said sensor being stored to provide data relating to said surface.

* * * * *